United States Patent

Sonnenschein

[11] Patent Number: 5,927,826
[45] Date of Patent: Jul. 27, 1999

[54] HYDRAULIC BRAKE SYSTEM WITH BRAKE SLIP CONTROL AND TRACTION SLIP CONTROL

[75] Inventor: Georg Sonnenschein, Eschborn, Germany

[73] Assignee: ITT Automotive Europe GmbH, Frankfurt, Germany

[21] Appl. No.: 08/716,229

[22] PCT Filed: Mar. 23, 1995

[86] PCT No.: PCT/EP95/01092

§ 371 Date: Jan. 7, 1997

§ 102(e) Date: Jan. 7, 1997

[87] PCT Pub. No.: WO95/25653

PCT Pub. Date: Sep. 28, 1995

[30] Foreign Application Priority Data

Mar. 23, 1994 [DE] Germany .............................. 44 09 911

[51] Int. Cl.⁶ .................................................. B60T 8/42
[52] U.S. Cl. ................................. 303/116.2; 303/113.2
[58] Field of Search ........................... 303/113.2, 113.1, 303/116.1, 116.2, 10, 11

[56] References Cited

U.S. PATENT DOCUMENTS

| 4,892,362 | 1/1990 | Takata . | |
|---|---|---|---|
| 5,330,258 | 7/1994 | Hoshoya et al. | 303/113.2 |
| 5,374,112 | 12/1994 | Takata et al. | 303/113.2 |

FOREIGN PATENT DOCUMENTS

| 4001421 | 7/1991 | Germany . |
|---|---|---|
| 4004315 | 8/1991 | Germany . |
| 4025859 | 2/1992 | Germany . |
| 4108756 | 9/1992 | Germany . |
| 4121604 | 1/1993 | Germany . |
| 4132469 | 4/1993 | Germany . |
| 4136109 | 5/1993 | Germany . |
| 4241913 | 6/1993 | Germany . |
| 4213710 | 10/1993 | Germany . |
| 4226646 | 2/1994 | Germany . |
| 2259340 | 3/1993 | United Kingdom . |
| WO 9205990 | 4/1992 | WIPO . |

OTHER PUBLICATIONS

Search Report of the German Patent Office for Application P4409911.8.

*Primary Examiner*—Matthew C. Graham
*Attorney, Agent, or Firm*—Rader, Fishman & Grauer PLLC

[57] ABSTRACT

To minimize the power losses of the pump motor in a hydraulic brake system with brake slip control and traction slip control, a shut-off valve prevents flow in the suction line when the supply pressure of the pump is sufficient for traction slip control. This prevents the aspiration of further pressure fluid volume from the pressure fluid reservoir. The pump does not return any fluid volume into the pressure fluid reservoir by way of a pressure-relief valve so that the motor of the pump is relieved. Preferably, the shut-off valve is designed so that the master cylinder pressure acts in the opening direction and the supply pressure of the pump acts in the closing direction of the shut-off valve, the valve being biassed in the opening direction by a compression spring.

2 Claims, 2 Drawing Sheets

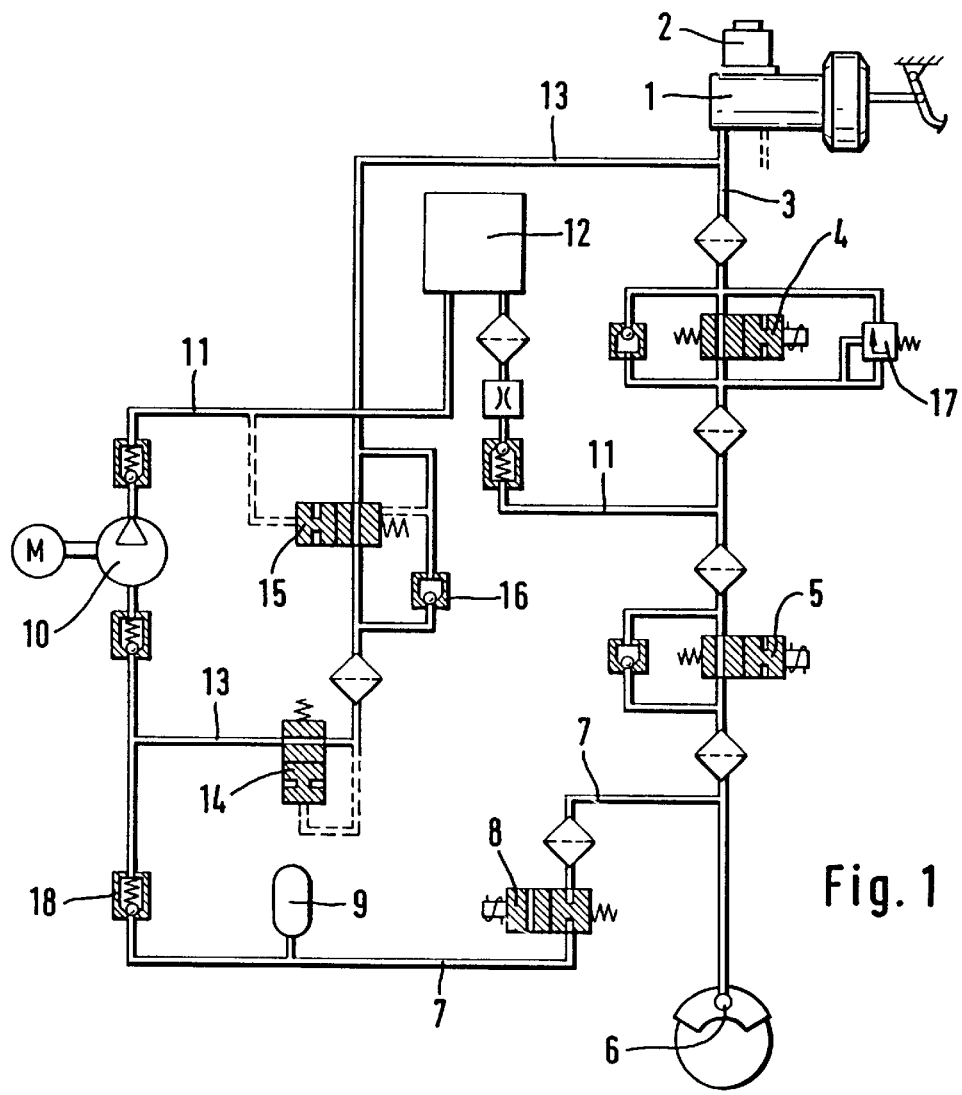
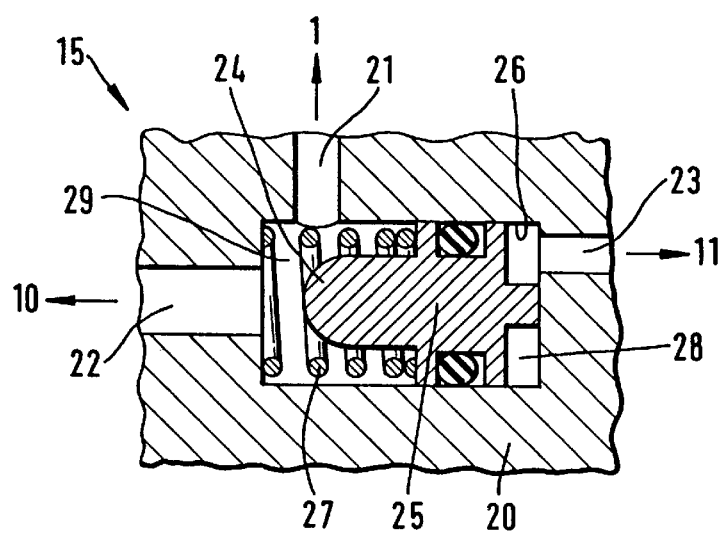

HYDRAULIC BRAKE SYSTEM WITH BRAKE SLIP CONTROL AND TRACTION SLIP CONTROL

The present invention relates to a hydraulic brake system and more particularly relates to brake systems having brake slip control and traction slip control. DE-A 41 08 756 discloses a brake system of this type which operates pursuant the return principle during brake slip control operations. Pressure fluid is discharged into the low-pressure accumulator due to the outlet valves opening, when the change-over valve is closed. The pressure fluid is returned by the return pump through the pressure line into the brake line. A suction line branches off from the brake line between the master cylinder and the point where the pressure line terminates into the brake line.

When the brake is not operated (hence, also during traction slip control operations), the change-over valve in the suction line is open so that the return pump, which is of the self-priming type, can aspirate pressure fluid from the pressure fluid reservoir by way of the master cylinder to feed the pressure fluid into the brake line. To prevent the pressure fluid from flowing back into the master brake cylinder, the separating valve, arranged between the port of the pressure line into the brake line and the point where the suction line branches from the brake line, is closed. There is uninterrupted operation of the pump during the entire traction slip control period. When the supply pressure required for traction slip control operations is reached, a pressure-relief valve connected in parallel to the separating valve will open towards the master cylinder. Due to the power losses of the pump motor caused by the permanent fluid supply to the master cylinder by way of the pressure-relief valve, the pump motor overheats and can only be used for a smaller number of pressure-increase phases during traction slip control.

Therefore, a brake system of the previously mentioned type was proposed in DE-A 40 25 859, wherein the pump is not a self-priming pump but is supplemented by a charging pump connected to the supply reservoir. In order to prevent power losses of the non-self-priming return pump, a shut-off valve is inserted into the connection between the charging pump and the return pump. The shut-off valve includes a control line having its pressure act upon the shut-off valve in the closing direction. The control line of the shut-off valve is connected to a pressure-relief line in which a pressure-relief valve is inserted which opens when the supply pressure of the return pump exceeds a certain extent. Thus, the control line of the shut-off valve is mostly disconnected from the pressure line of the pump and is connected with the pressure side of the pump only when the pressure-relief valve discharges a too high pump pressure. The pressure-relief valve is acted upon by the master cylinder pressure in the closing direction so that it can open only when the master cylinder is not operated. If the pump produces an excessively high pressure and tends to overheating during a traction slip control operation, the pressure-relief valve will open and conduct the supply pressure of the pump into the control line of the shut-off valve. The shut-off valve closes, as does the pressure-relief valve, because a second pressure-relief valve with a lower opening pressure provides another connection between the pressure-relief line and the pressure fluid supply reservoir, thereby causing pressure reduction in the pressure line of the pump. Because the closing pressure of the shut-off valve is lower than the opening pressure of the second pressure-relief valve, however, the shut-off valve may re-open only after the pressure in the control line has been reduced by way of a throttle connected in parallel to the second pressure-relief valve. Thus, the point of time of opening of the shut-off valve depends only on whether the pressure in the valve's control line, which pressure is irrespective of the pressure side of the pump when the first pressure-relief valve is closed, has been reduced by way of the throttle. On the one hand, this implies that at a point of time where the inlet valves open for further pressure reduction and, thus, the pressure in the pressure line drops, the shut-off valve is still closed and the pump cannot replenish pressure fluid. Or, the case may be that the shut-off valve will open already, due to the decreased pressure in the control line, although further pressure increase in the wheel brakes is not yet required.

An object of the present invention is to configure a brake system of the previously mentioned type so that the shut-off valve on the suction side of the pump opens and closes in conformity with requirements.

This object is achieved by providing a permanent connection between a control chamber of the shut-off valve and the pressure line of the pump that, on the one hand, the shut-off valve is closed by the pressure in the pressure line, but that, on the other hand, the shut-off valve will be opened immediately in the event of a decline of the pressure in the pressure line. A decline of the pressure in the pressure line is caused by opening an inlet valve for pressure increase, for example. Pressure fluid will be available instantaneously at the suction side of the pump because the shut-off valve opens without delay.

To ensure reliable closure of the shut-off valve only during a traction slip control operation rather than during a brake slip control operation, it is preferred to impart a larger effective surface to the master cylinder pressure than to the supply pressure of the pump.

This provision permits mounting the shut-off valve directly on the suction side of the pump because the connection to the low-pressure accumulator is ensured during brake slip control operations. If necessary, integration of the shut-off valve in a pump housing is possible.

BRIEF DESCRIPTION OF THE DRAWINGS

FIG. 1 is a schematic drawing brake system of the present invention.

FIG. 2 is a shut-off valve appropriate for use on a brake system of FIG. 1.

DETAILED DESCRIPTION OF THE PREFERRED EMBODIMENTS

Figure 3:
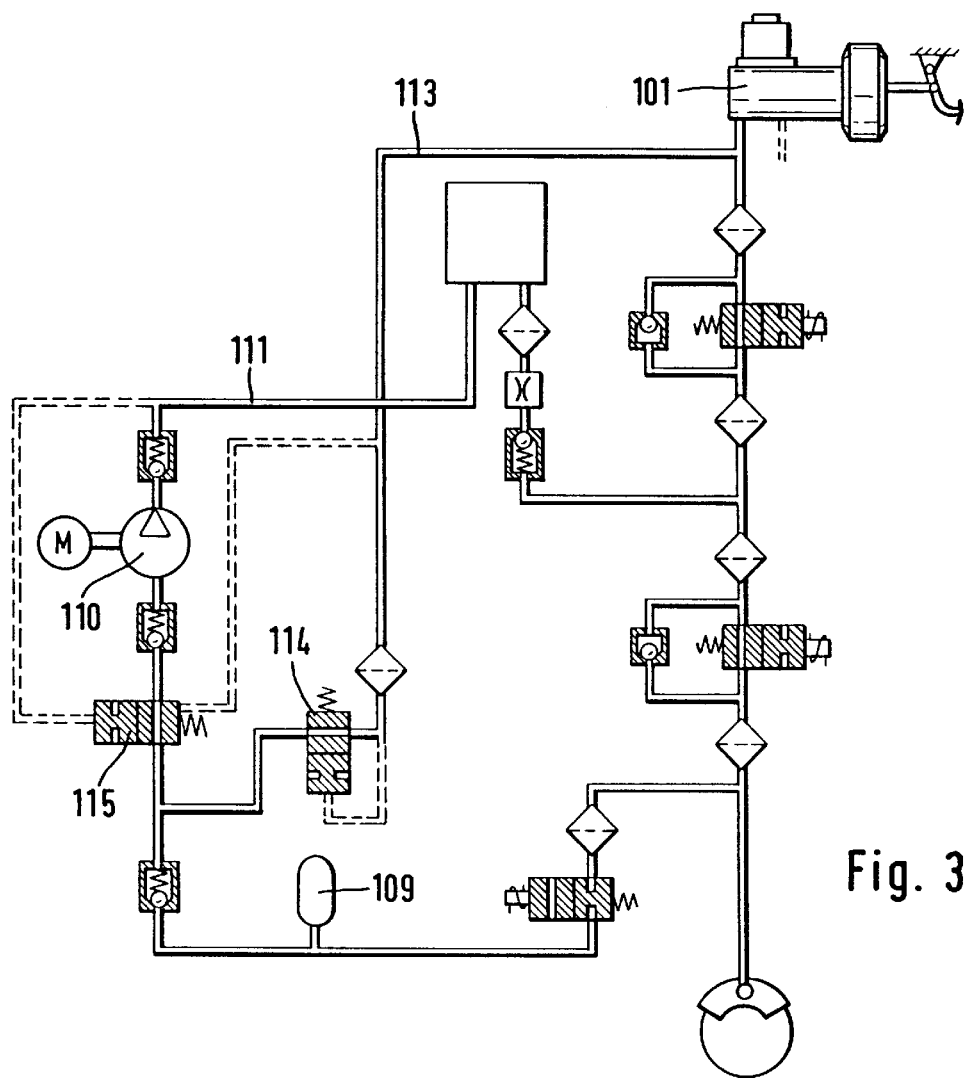
FIG. 3 is a second embodiment of a brake system of the present invention.

The hydraulic circuit arrangement shown in FIG. 1 includes only the elements essential for the description of the present invention. Sensors and the evaluating electronic unit necessary for slip control are not shown. Also, only one brake circuit is shown, whose second wheel brake cylinder, which is usually included in the fluid supply, is omitted for the sake of clarity.

From master cylinder 1 connected to a pressure fluid reservoir 2, a brake line 3 extends to a wheel cylinder 6 by way of an electromagnetically operated, normally open separating valve 4 and a normally open inlet valve 5 which is also operated electromagnetically. A return line 7 extends from a wheel cylinder 6 to a low-pressure accumulator 9 by way of an electromagnetically operated, normally closed outlet valve 8, and further to the suction side of a pump 10. The pressure side of pump 10 is connected to the brake line 3 between the separating valve 4 and the inlet valve 5 by way of a pressure line 11 and a damping chamber 12 which cushions the pressure pulses of the pump. To aspirate pressure fluid during traction slip control, pump 10 additionally includes a suction line 13 which branches from the brake line 3 between the master cylinder 1 and the separating valve 4 and leads to the suction side of pump 10. A hydraulically operated, normally open change-over valve 14 and a hydraulically operated, normally open shut-off valve 15 are arranged in the suction line 13. A non-return valve 16 opening from the suction side of the pump 10 to the master cylinder 1 is connected in parallel to the shut-off valve 15.

The operation of the brake system during normal pedal-operated braking and during brake slip control corresponds to the operation of a state of the art brake system.

For traction slip control, pump 10 aspirates fluid from the pressure fluid reservoir 2 by way of suction line 13, the open change-over valve 14 and the open shut-off valve 15, and the master cylinder 1. The separating valve 4 in brake line 3 is then closed. The aspirated pressure fluid is conducted by pump 10 through the pressure line 11 and the damping chamber 12 into the brake line 3 downstream of the separating valve 4, and into the wheel cylinder 6 by way of the open inlet valve 5. When the braking pressure in the wheel cylinder 6 is sufficient for traction slip limitation, inlet valve 5 will close, permitting pressure to build up in the brake line 3 only between the separating valve 4 and the inlet valve 5. The pressure is generally identical to the pressure on the pressure side of the pump 10. When the pressure in the pressure line 11 has reached a predetermined value which is in excess of the amount of braking pressure necessary for traction slip control, the shut-off valve 15 will be closed hydraulically by the pressure in the pressure line. Thus, pump 10 is prevented from aspirating additional pressure fluid from the pressure fluid reservoir 2. When a new pressure increase phase becomes necessary after pressure reduction in the wheel cylinder 6 due to opening of outlet valve 8, the inlet valve 5 will re-open, and the pressure in the pressure line 11 decreases. This causes the shut-off valve 15 to re-open so that the pump 10 can conduct a fluid flow into the pressure line again.

A pressure-relief valve 17 is connected in parallel to the separating valve 4. The purpose of the pressure-relief valve 17 (as shown) is to decrease pressure fluid towards the master cylinder 1, which is still discharged from the wheel cylinder 6 to the pump 10, even when the shut-off valve 15 is closed. The pilot pressure of the pressure-relief valve 17 is in excess of the closing pressure of the shut-off valve 15 to prevent the above-mentioned shortcomings of a permanent pressure fluid delivery.

To prevent the self-priming pump 10 from excessively retracting the brake shoes of the wheel brakes and from causing a large lost motion during pedal-operated braking, which is due to an excessive pressure decrease in the return line 7 when the shut-off valve 15 is closed, a non-return valve 18 is inserted into the return line 7 between the low-pressure accumulator 9 and the suction side of the pump 10 for safety reasons. The pilot pressure of non-return valve 18 amounts to roughly 1 bar so that the pressure in the return line 7 will always be at least as high as the atmospheric pressure, even at a major suction rate of the pump.

FIG. 2 shows an example of an appropriate shut-off valve 15. Shut-off valve 15 includes three pressure fluid ports 21, 22 and 23 in a housing 20. One port 21 is associated with the portion of suction line 13 close to the master cylinder 1, and the second port 22 leads to the suction side of the pump 10. The third pressure fluid port 22 is connected to the pressure line 11. The connection between the pressure fluid ports 21 and 22 is governed by a seat valve having its closure member 24 shaped on a floating piston 25. The floating piston 25 is axially slidable in a housing bore 26 and is acted upon by a compression spring 27 so as to open the valve. Floating piston 25 is sealed in relation to the housing bore 26 and separates a control chamber 28, connected to the pressure fluid port 23, from a valve chamber 29 including pressure fluid ports 21 and 22.

Thus, the supply pressure of the pump is applied to control chamber 28, and the respective master cylinder pressure prevails in valve chamber 29. The supply pressure of the pump acts on the total cross-sectional surface of the floating piston 25 so as to close the valve. The effective surface of the master cylinder pressure is produced from the difference between the piston cross-section and the closing surface of the valve. The pressure on pressure fluid port 22, which corresponds to the pressure on the suction side of the pump when the change-over valve 14 is open, acts upon the valve closing surface.

It is achieved by this construction that the shut-off valve 15 is permanently open during pedal-operated braking and pressure build-up in the master cylinder 1 because the compression spring 27 also acts in the opening direction and, along with the master cylinder pressure, applies a force to the floating piston 25 which is in excess of the supply pressure of the pump 10. When the master cylinder is not operated, however, the valve chamber 29 is under atmospheric pressure so that the supply pressure of the pump, from the control chamber 28, displaces the floating piston 25 in the closing direction of the valve, thereby closing the shut-off valve 15. In this arrangement, the compression spring 27 has a rigid design sufficient to cause displacement of the floating piston 25 only when the pressure in the control chamber 26 exceeds a desired nominal value. As soon as the nominal value is not reached, the shut-off valve 15 re-opens.

The brake system of FIG. 3 is largely identical to the brake system of FIG. 1. Therefore, like parts of both Figures have like reference numerals, increased by 100 in FIG. 3. The only difference is the arrangement of the shut-off valve 115. In FIG. 3, shut-off valve 115 is arranged directly on the suction side of the pump 110 so that both the pressure-fluid supply from master cylinder 101 and the supply line from low-pressure accumulator 109 is closed when the shut-off valve 115 closes. It is important in this respect that the control pressure generated in the master cylinder 101 and acting in the opening direction of the shut-off valve 115 is taken from the suction line 113 at a point disposed between the master cylinder 101 and the change-over valve 114. The reason is that in a pedal-operated braking operation, the change-over valve 114 is closed so that only low pressure prevails between the change-over valve 114 and the shut-off valve 115. At a high supply pressure of pump 110, this low pressure would not be in a position to keep the shut-off valve 115 open. The result would be that the pump 110 could not aspirate pressure fluid from the low-pressure accumulator 109.

Figure 4:
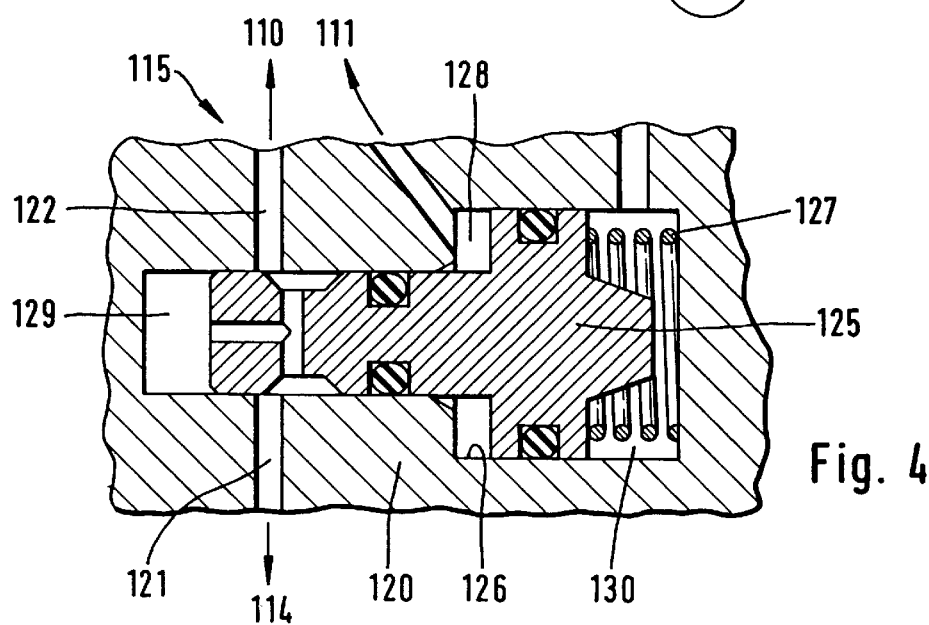
FIG. 4 is a shut-off valve appropriate for use on a brake system of FIG. 3.

FIG. 4 shows a preferred embodiment of the shut-off valve 115. Apart from chamber 128, i.e. the control chamber that is acted upon by the supply pressure of the pump 110, and the valve chamber 129, the shut-off valve 115 still includes another control chamber 130 in which master cylinder pressure is connected. Compression spring 127, which acts in the valve opening direction, is also arranged in the second control chamber 130. Shut-off valve 115 includes a stepped bore 126 in housing 120. A stepped piston 125 is sealed twice and axially slidable in stepped bore 126. The large sealed piston cross-section frontally confines a control chamber 130. Valve chamber 128 is arranged between the two sealed piston cross-sections, i.e. in the intermediate axial portion of the stepped piston 125 with the piston step. Valve chamber 129, into which the pressure fluid ports 121 and 122 terminate, is arranged on the piston front face of small cross-section. The connection between the two pressure fluid ports is controlled by a slide valve having its control edge shaped on the stepped piston 125.

The separate control chamber 130 is required because the master cylinder pressure must act so as to open the shut-off valve, although the master cylinder 101 shall be separated from the suction side of pump 110 during traction slip control. Because the master cylinder pressure in the control chamber 130 has the largest of all effective surfaces, the shut-off valve 115 will be reliably opened during pedal-operated braking. The supply pressure of the pump 110, which acts on the surface of the piston step, therefore, can close the shut-off valve 115 only when the master cylinder 101 is unpressurized and the supply pressure is sufficient to compress the compression spring 127. If this is the case, the stepped piston 125 will displace in opposition to the compression spring 127 so that the control edge overrides the pressure fluid ports 121 and 122 and thereby throttles the pressure fluid supply to the pump I 10. The result is that the shut-off valve 115 automatically causes a controlled decrease of the fluid flow propagating to the pump 110. Apart from taking into account the corresponding surface ratios, there are no constraints with respect to the construction of the shut-off valve 115. For example, it is also possible to use a seat valve kept open by a tappet when the stepped piston 125 is in its inactive condition. The inactive condition is determined by the compression spring 127.

I claim:

1. Hydraulic brake system of the type including a master cylinder connected to a pressure fluid reservoir, at least one wheel cylinder that is connected to the master cylinder by way of a brake line and associated with a driven wheel self-priming pump connected to the wheel cylinder by way of a return line, and the pressure side of the pump being connected to the brake line by way of a pressure line, a low-pressure accumulator on the return line having an inlet valve in the brake line between the port of the pressure line and the wheel cylinder, and outlet valve arranged in the return line between the wheel cylinder and the low-pressure accumulator, a first shut-off valve arranged in the brake line between the master cylinder and the port of the pressure line, a suction line which connects the suction side of the pump to the brake line between the master cylinder and the first shut-off valve, and a change-over valve arranged in the suction line, comprising:

a second shut-off valve that is spring-loaded in the open direction, wherein said second shut-off valve includes a piston that is acted upon by the master cylinder pressure in the opening direction and the supply pressure of the pump in the closing direction and said second shut-off valve is arranged in said suction line to close when the supply pressure of the pump exceeds a predetermined value while the master cylinder is not operated, wherein said second shut-off valve includes a control chamber which is permanently connected to the pressure line wherein the master cylinder pressure acts upon a larger surface of the piston than the supply pressure of the pump.

2. Hydraulic brake system of the type including a master cylinder connected to a pressure fluid reservoir, at least one wheel cylinder that is connected to the master cylinder by way of a brake line and associated with a driven wheel, a self-priming pump connected to the wheel cylinder by way of a return line, and the pressure side of the pump being connected to the brake line by way of a pressure line, a low-pressure accumulator on the return line having an inlet valve in the brake line between the sport of the pressure line and the wheel cylinder and outlet valve arranged in the return line between the wheel cylinder and the low-pressure accumulator, a first shut-off valve arranged in the brake line between the master cylinder and the port of the pressure line, a suction line which connects the suction side of the pump to the brake line between the master cylinder and the first shut-off valve, and a change-over valve arranged in the suction line, comprising:

a second shut-off valve that is spring-loaded in the open direction wherein said second shut-off valve includes a piston that is acted upon by the master cylinder pressure and the supply pressure of the pump, said shut-off valve being arranged in said suction line to close when the supply pressure of the pump exceeds a predetermined value while the master cylinder is not operated, wherein said second shut-off valve includes a control chamber which is permanently connected to the pressure line and wherein the second shut-off valve is acted upon by the master cylinder pressure in the opening direction and the master cylinder pressure acts upon a larger surface of the piston than the supply pressure of the pump; and wherein the return line terminates into the suction line and the second shut-off valve is interposed between the port of the return line and the suction side of the pump.

* * * * *